United States Patent
Sastry et al.

(10) Patent No.: US 11,269,753 B2
(45) Date of Patent: Mar. 8, 2022

(54) MULTI-LAYERED COMPUTING SYSTEM ATTRIBUTE DEPENDENCY

(71) Applicant: Kyndryl, Inc., New York, NY (US)

(72) Inventors: Shashidhar Sastry, Pune (IN); Rahul Chenny, Bangalore (IN); Debasisha Padhi, Bangalore (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 16/866,893

(22) Filed: May 5, 2020

(65) Prior Publication Data
US 2021/0349802 A1    Nov. 11, 2021

(51) Int. Cl.
*G06F 11/34*     (2006.01)
*G06K 9/62*      (2006.01)
*G06N 20/00*     (2019.01)

(52) U.S. Cl.
CPC ........ *G06F 11/3409* (2013.01); *G06K 9/6227* (2013.01); *G06N 20/00* (2019.01)

(58) Field of Classification Search
CPC .. G06F 11/3409; G06N 20/00; G06K 9/6227; G06Q 10/063; G06Q 10/0633; G06Q 10/0639; G06Q 10/06393
See application file for complete search history.

(56) References Cited

U.S. PATENT DOCUMENTS

| 8,538,787 | B2  |   | 9/2013 | Braun et al. |                    |
|-----------|-----|---|--------|--------------|--------------------|
| 2013/0041924 | A1 | * | 2/2013 | Vernier      | G06F 16/9024 707/798 |
| 2017/0154291 | A1 | * | 6/2017 | Dau          | G06Q 10/06393      |
| 2018/0001899 | A1 | * | 1/2018 | Shenoy       | B60W 40/08         |
| 2020/0226525 | A1 | * | 7/2020 | Bhattacharya | G06Q 10/06393      |
| 2021/0019652 | A1 | * | 1/2021 | Gadelrab     | G06F 11/3447       |

OTHER PUBLICATIONS

Kang et al., "A Hierarchical Structure of Key Performance Indicators for Operation Management and Continuous Improvement in Production Systems", International Journal Research, vol. 54, 2016, Issue 21, Feb. 1, 2016.

(Continued)

*Primary Examiner* — Manuel L Barbee
(74) *Attorney, Agent, or Firm* — Heslin Rothenberg Farley & Mesiti P.C.; Michael A. Petrocelli, Esq.

(57) ABSTRACT

A method, computer program product, and a system where a processor(s) obtains, from a data source, a list of objects at different layers of a computing system. The processor(s) generates exploration lists from the list (each exploration list with objects for a layer). The processor(s) identifies updated and new data at the layers associated with the objects on the list; the identified data comprises attributes for each layer. The processor(s) applies machine learning algorithm(s) to enrich the data by identifying dependencies between the attributes for each layer as influencers for one or more key performance indicators of the computing system. The processor(s) generates, from the enriched data, a hierarchy matrix. The processor(s) determines, based on the hierarchy matrix that an event associated with one or more computing resources of the computing system will influence a particular key performance indicator.

20 Claims, 13 Drawing Sheets

(56) References Cited

OTHER PUBLICATIONS

"Method and System for Cognitive KPI Using Learned Navigation Patterns", IP.com: https://priorart.ip.com/IPCOM000256646, Dec. 18, 2018.

Galar et al., "Maintenance Metrics: A Hierarchical Model of Balanced Scorecard", 2011 IEEE International Conference on Quality and Reliability, https://ieeexplore.ieee.org/document/6031683, Sep. 29, 2011.

Dasgupta et al., "Creating a KPI Tree for Monitoring and Controlling Key Business Objectives of First Mile Logistics Services", Prooceedings of the International Conference on Industrial Engineering and Operations Management, http://www.ieomsociety.org/ieom2019/papers/206.pdf, Mar. 7, 2019.

Mell et al., "The NIST Definition of Cloud Computing", National Institute of Standards and Technology, U.S. Dept. of Commerce, NIST Special Publ. 800-145, Sep. 2011, 7 pages.

\* cited by examiner

MULTI-LAYERED COMPUTING SYSTEM ATTRIBUTE DEPENDENCY

BACKGROUND

A Key Performance Indicator (KPI) is a measurable value that demonstrates how effectively a company is achieving key business objectives. Organizations use KPIs at multiple levels to evaluate their success at reaching targets. High-level KPIs may focus on the overall performance of the business, while low-level KPIs may focus on processes in departments such as sales, marketing, human resources (HR), support, etc. Many businesses measure performance based on KPIs, and these measures indicate the overall health of the business. How a KPI is determined, for a given business, can differ as factors differ such as industry, competition, geographical location, market size, and/or consumer behavior. KPIs can be defined and hence, impacted, by both external and internal factors. An example of an external factor is an unplanned event, such as a product shortage impacting a supply chain (including costs and inventory), based, for example, a weather event. Internal factors include, but are not limited to, health issues of the internal Information Technology Systems (e.g., resource constraints such as application design, poor performance, unavailability, etc.). Corporate stakeholders need to track a business' KPI performance to make important business decisions.

SUMMARY

Shortcomings of the prior art are overcome and additional advantages are provided through the provision of a method for building dependencies between attributes in object layers of a computing system to anticipate impacts on internal key performance indicators. The method includes, for instance: obtaining, by one or more processors, from a data source, a list of objects at different layers of a computing system, wherein the layers comprise nodes, applications, interfaces, services, and processes; generating, by the one or more processors, exploration lists from the list, wherein each exploration list comprises objects for a given layer of the computing system; identifying, by the one or more processors, based on utilizing the exploration lists, updated data and new data at each of the layers, wherein the updated data and the new data are associated with the objects comprising the list, wherein the identified data comprises attributes for each layer; applying, by the one or more processors, one or more machine learning algorithms to the identified data to enrich the updated data and the new data by identifying dependencies between one or more groups of the attributes for each layer, wherein each group of the one or more groups comprises influencers for one or more key performance indicators of the computing system; generating, by the one or more processors, from the enriched data, a hierarchy matrix, wherein the hierarchy matric comprises trees representing each group of the one or more groups; and determining, by the one or more processors, based on the hierarchy matrix that an event associated with one or more computing resources of the computing system will influence a particular key performance indicator.

Shortcomings of the prior art are overcome and additional advantages are provided through the provision of a computer program product for building dependencies between attributes in object layers of a computing system to anticipate impacts on internal key performance indicators. The computer program product comprises a storage medium readable by a processing circuit and storing instructions for execution by the processing circuit (or one or more processors) for performing a method. The method includes, for instance: obtaining, by the one or more processors, from a data source, a list of objects at different layers of a computing system, wherein the layers comprise nodes, applications, interfaces, services, and processes; generating, by the one or more processors, exploration lists from the list, wherein each exploration list comprises objects for a given layer of the computing system; identifying, by the one or more processors, based on utilizing the exploration lists, updated data and new data at each of the layers, wherein the updated data and the new data are associated with the objects comprising the list, wherein the identified data comprises attributes for each layer; applying, by the one or more processors, one or more machine learning algorithms to the identified data to enrich the updated data and the new data by identifying dependencies between one or more groups of the attributes for each layer, wherein each group of the one or more groups comprises influencers for one or more key performance indicators of the computing system; generating, by the one or more processors, from the enriched data, a hierarchy matrix, wherein the hierarchy matric comprises trees representing each group of the one or more groups; and determining, by the one or more processors, based on the hierarchy matrix that an event associated with one or more computing resources of the computing system will influence a particular key performance indicator.

Methods and systems relating to one or more aspects are also described and claimed herein. Further, services relating to one or more aspects are also described and can be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
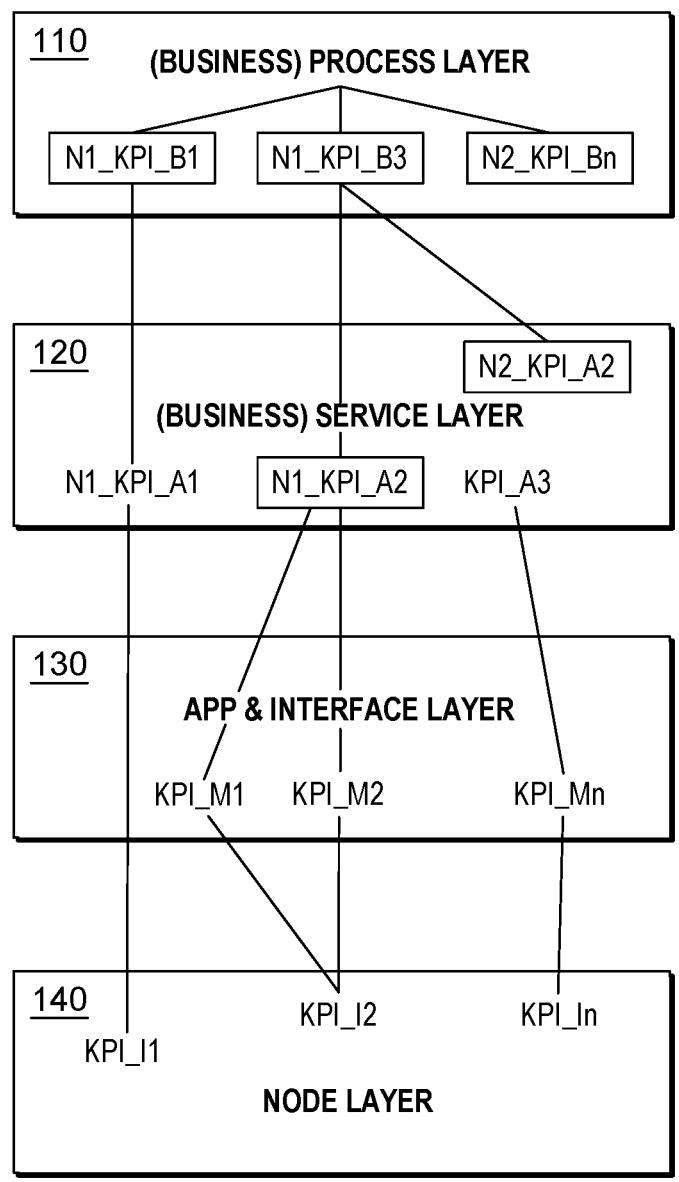
FIG. 1 illustrates various aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 11:
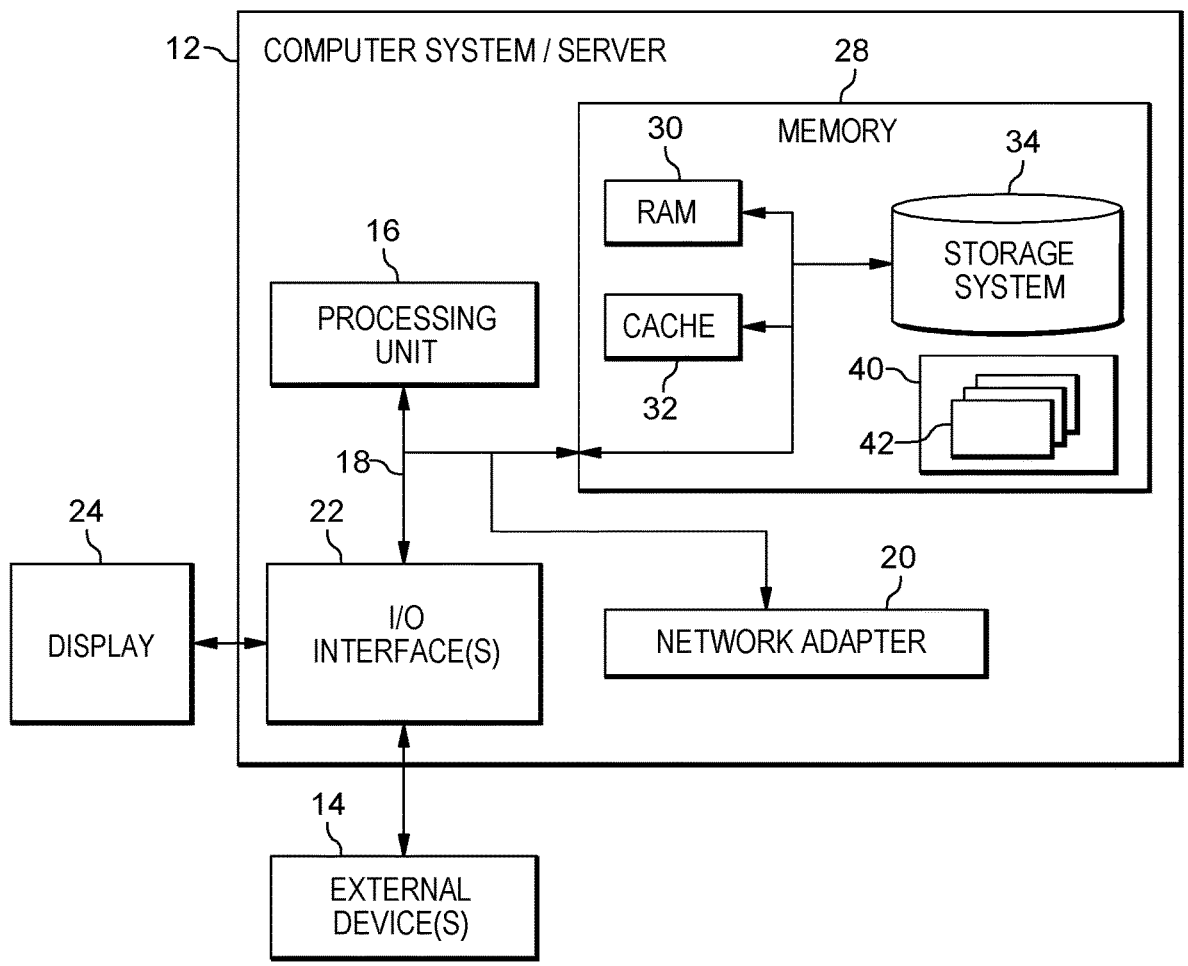
FIG. 11 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 11 as program/utility 40, having a set (at least one) of program modules 42, can be stored in memory 28.

Embodiments of the present invention include a computer-implemented method, a computer program product, and a computer system, where program code executed by one or more processors provides a holistic and extensible business-to-information technology (IT) KPI correlation framework that spans over an enterprise. Program code in embodiments of the present invention provides an end-to-end intelligent correlation between a business KPI of a given entity, and the system KPI, of the given entity. The system resources utilized by the entity can be as vast as resources across a hybrid multi-cloud enterprise IT ecosystem. To this end, in embodiments of the present invention, program code executing on at least one processor dynamically discovers and derives a contextual semantic meaning of new and existing correlation attributes and KPIs of enterprise business process influencers using rule engines, analytics, and/or cognition on discovered label data in a given IT ecosystem. An attribute can be a type-label and/or a type-label-value. Hence, a label can be understood herein to be an example of an attribute. The program code can generate and maintain a bidirectional dependency hierarchy tree using these rule engines, analytics and cognition on correlation and KPI attributes of all influencer types in the IT ecosystem. Each dependency is an induced or deduced relationship between two measurable parameters where the changing of one will or can affect the other. In some embodiments of the present invention, the program code detects quality and cost impacts on a business process domain using anomalies revealed by the dependency hierarchy, leading to trigger points for remediation of performance and efficiency. The program code can dynamically identify an area of interest in an enterprise dependency hierarchy and dynamically update it for further applications. For example, in some embodiments of the present invention, the program code utilizes cognitive techniques to identify new relationships between, for example, influencer tuples (e.g., values, records) in an interlocking series and to update, dynamically, the dependency hierarchy tree for the identified area.

Aspects of embodiments of the present invention are inextricably linked to computing because, as will be discussed herein, in some embodiments of the present invention, program code executing on one or more processors, utilizes computing objects at various layers of a computing system to build and update a model that enables users to anticipate computing issues based on the functionality and/or capacity of the given computing system. Thus, program code mapping dependencies between computing objects themselves is utilized to diagnose, anticipate, and rectify issues related to the functionality of the system itself. Hence, the issue being addressed by aspects of the present invention, as well as the approach, are both inextricably linked to computing. Additionally, aspects of the present invention provide a practical approach to anticipating impacts of events within a computing system, at different layers of the computing systems, on key performance indicators. As will be described herein, aspects of some embodiments of the present invention alert users to issues, assist in mitigating the issues, and enable the user to monitor the mitigation until the negative impact is no longer anticipated. Additionally, embodiments of the present invention continue to monitor aspects of the computing system such that issue prediction and mitigation improves through continued machine learning.

Aspects of embodiments of the present invention also provide significant advantaged over existing approaches to anticipating and mitigating issue with internal KPIs in enterprise computing environments. For example, embodiments of the present invention utilize object discovery at each layer of a computing system and determine dependencies between all layers, as existing approaches are largely limited to monitoring (generally, manually) only, for example, services within an environment. Thus, embodiments of the present invention provide a multi-layer approach that is automated and is particularly useful in a multi-layer enterprise system, in which existing approaches cannot be utilized based on their limitations.

FIG. 1 provides an overview of various aspects of some embodiments of the present invention when implemented in an enterprise IT environment, including but not limited to, a hybrid multi-cloud environment. As explained above, embodiments of the present invention map business KPIs to system KPIs, thus, generating a (self-learning) model that provides insights into business KPIs by understanding the transactions performed in the IT environment in the course of conducting that business and anticipating any issues within the environment that could impact these transactions, and, therefore, the business itself. FIG. 1 depicts various aspects of a technical environment 100 utilized by at least one business entity. The technical environment includes various layers: a node layer 140, an application and interface layer 130, a service layer 120, and a process layer 110. Nodes comprising the node layer 140 are hosts for running applications and the node themselves can be physical or virtual resources. A given node can be a compute node for running a business or technical support application, a storage node for data files or a database, and/or a network node for switching, routing, load balancing, gateway, domain name serving, proxy, etc. The application and interface layer 130 includes applications, which, herein, include executable software that provides a set of business and/or technical functions through interfaces. The application and interface layer 130 also includes interfaces, which are constructs that allow a given application's functions to be made available for use by other applications in order to create services. The service layer 120 includes these services, which are business and/or technical functions enabled by the aforementioned interfaces that are available (through time) for providing business and/or technical transactions that support business processes. Thus, the (business) process layer 110 includes processes that are each a designed sequence of inter-application transactions that provide a useful outcome for the business. An end-user (of a given entity) consumes and/or interacts with one or more business processes, at a business process layer 110. The business transaction translates to system transactions as it flows through various components across multiple layers of the technical environment 100 ranging from a business service layer 120 to infrastructure, which includes application and interface layers 130 and node layers 140 (interacting with individual computing node resources, including but not limited to, hardware resources). The health of business processes (which, as illustrated, originate at the business process layer 110) can be measured by program code executing on at least one processor as a combination of one or more attributes (e.g., labels) including, but not limited to, availability, speed, capacity, reliability, and/or consistency, which are referred to as KPIs. As illustrated in FIG. 1, each component or deployment unit in each layer of the technical architecture 100 has its respective KPIs. The business process layer 110, in this example, is governed by N1_KPI_B1, N1_KPI_B2, through N1_KPI_Bn. At the service layer 120, the application performance KPIs are N_KPI_A1, N_KPI_A2, N_KPI_A3, at the application and interface layer 130, the KPIs are infrastructure 140 KPIs (KPI_I2) etc.

As illustrated in FIG. 1, each system comprising the environment 100 can host a variety of deployment units including, but not limited to, applications, middleware, polyglot databases, and/or multi-cloud infrastructure and networking components. A collection of these systems are also associated with each other to realize a business service and process, hence, a KPI can be shared by aspects of different layers of a technical environment 100. As will be discussed herein, in embodiments of the present invention, program code executing on one or more processors can intelligently stitch (together) disparate and diverse relationships and associated KPIs to form a complex relationship with bidirectional navigation (e.g., top down, bottom up and middle out). Hence, in embodiments of the present invention, program code generates a multi-level hierarchical relationship between disparate KPIs across systems. Based on generating this hierarchy of KPIs, the program code can identify anomalies and/or issues of various types that can affect the health of the business domain performance and can be utilized to intervene for rectification. In some embodiments of the present invention, the program code triggers and/or automatically implements interventions to mitigate the issues identified.

Figure 2:
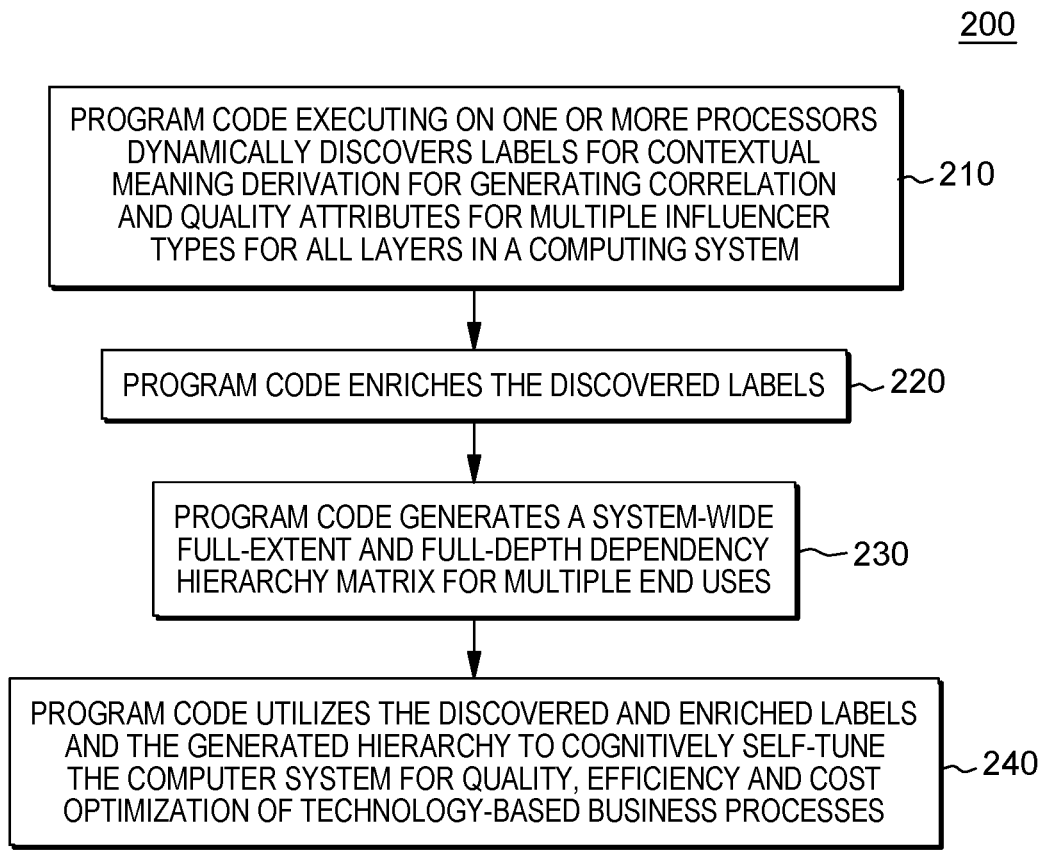
FIG. 2 is a workflow that depicts various aspects of some embodiments of the present invention.

FIG. 2 is a general workflow 200 that depicts various aspects of some embodiments of the present invention. In an embodiment of the present invention, program code executing on one or more processors dynamically discovers labels for contextual meaning derivation for generating correlation and quality attributes for multiple influencer types for all layers in a computing system (210). In some embodiments of the present invention, the computing system is an enterprise computing system. In some embodiments of the present invention, the program code enriches the discovered labels (220). The program code generates a system-wide full-extent and full-depth dependency hierarchy matrix for multiple end uses (230). The program code utilizes the discovered and enriched labels and the generated hierarchy to self-tune, cognitively, the computer system for quality, efficiency and cost optimization of technology-based business processes (240).

Figure 3:
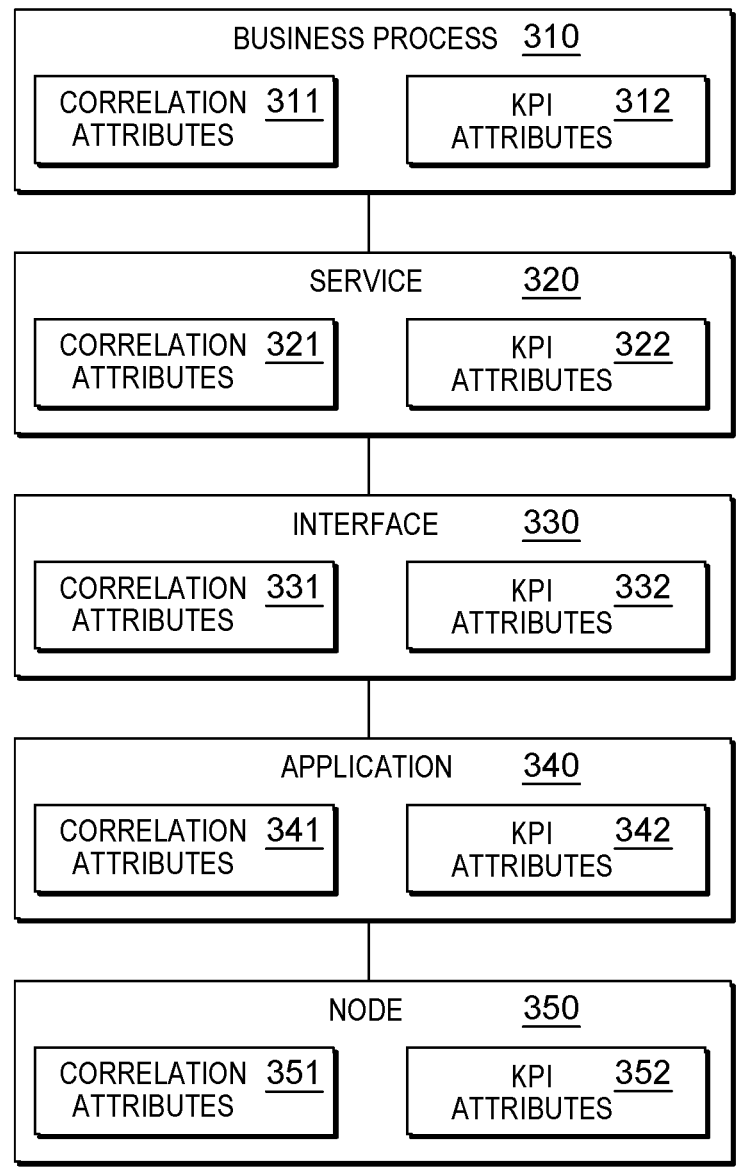
FIG. 3 is an example of aspects of a hierarchy matrix generated by program code in some embodiments of the present invention.

FIG. 3 depicts a hierarchy 300 (e.g., FIG. 2, 230) generated and utilized by aspects of various embodiments of the present invention. As discussed above, program code in embodiments of the present invention dynamically discovers labels for contextual meaning derivation for generating correlation and quality attributes for multiple influencer types for all layers in a computing system (e.g., FIG. 2, 210). The program code generates a system-wide hierarchy 300 (FIG. 2, 230), as example of which is depicted in FIG. 3. As depicted in FIG. 3, the various layers of a given (e.g., enterprise) computer system in the hierarchy 300 generated by the program code include various KPI attributes. As illustrated in FIG. 3, a hierarchy 300 of a given computer system includes a business process layer 310, a service layer 320, an interface layer 330, an application layer 340, and a node layer 350. Each layer includes various attributes that affect various internal factors that affect KPIs. Embodiments of the present invention include program code that can identify and correlate attribute in layers in order to generate a hierarchy matrix that represents the interconnectivity of various aspects of the layers when impacting different uses of the computing system and hence, internal KPI measures. As aforementioned, internal KPI factors include health issues of the IT systems (e.g., resource constraints, including but not limited to, application design, performance, availability etc.). Program code in embodiments of the present invention generate correlation attributes 311, 321, 331, 341, 351 and quality attributes (also referred to as KPI attributes) 312, 322, 332, 342, 352, for multiple influencer types, for all layers in a computing system (e.g., FIG. 2, 210-220).

As understood by one of skill in the art, a node can have one to many applications. An application can have one to many interfaces. An interface can have between one and many services. A service can have between one and many processes. Also, a node, an application, an interface, a service, and/or a process, can each have one to many KPIs. Thus, in some embodiments of the present invention, program code identifies and provides correlation (dependency) attributes 311, 321, 331, 341, 351 first then the KPI attributes 312, 322, 332, 342, 352. As aforementioned, an attribute can be a type-label and/or a type-label-value; a label can be understood herein to be an example of an attribute.

The hierarchy 300 generated by the program code in various embodiments of the present invention, as depicted from the bottom to the top is the node 350, the application 340, the interface 330, the service 320, and the business process 310. These parts of the hierarchy are illustrated as singular items for clarity but can represent multiples at each level of the hierarchy. Each KPI at each level (e.g., layer) depends on one or more KPIs from one or more lower levels (e.g., layers). Thus, a KPI at the business process level 310, can depend of one or more KPIs from the lower levels (e.g., layers), which are: the node 350, the application 340, the interface 330, and the service 320 levels (e.g., layers) of the hierarchy.

Figure 4:
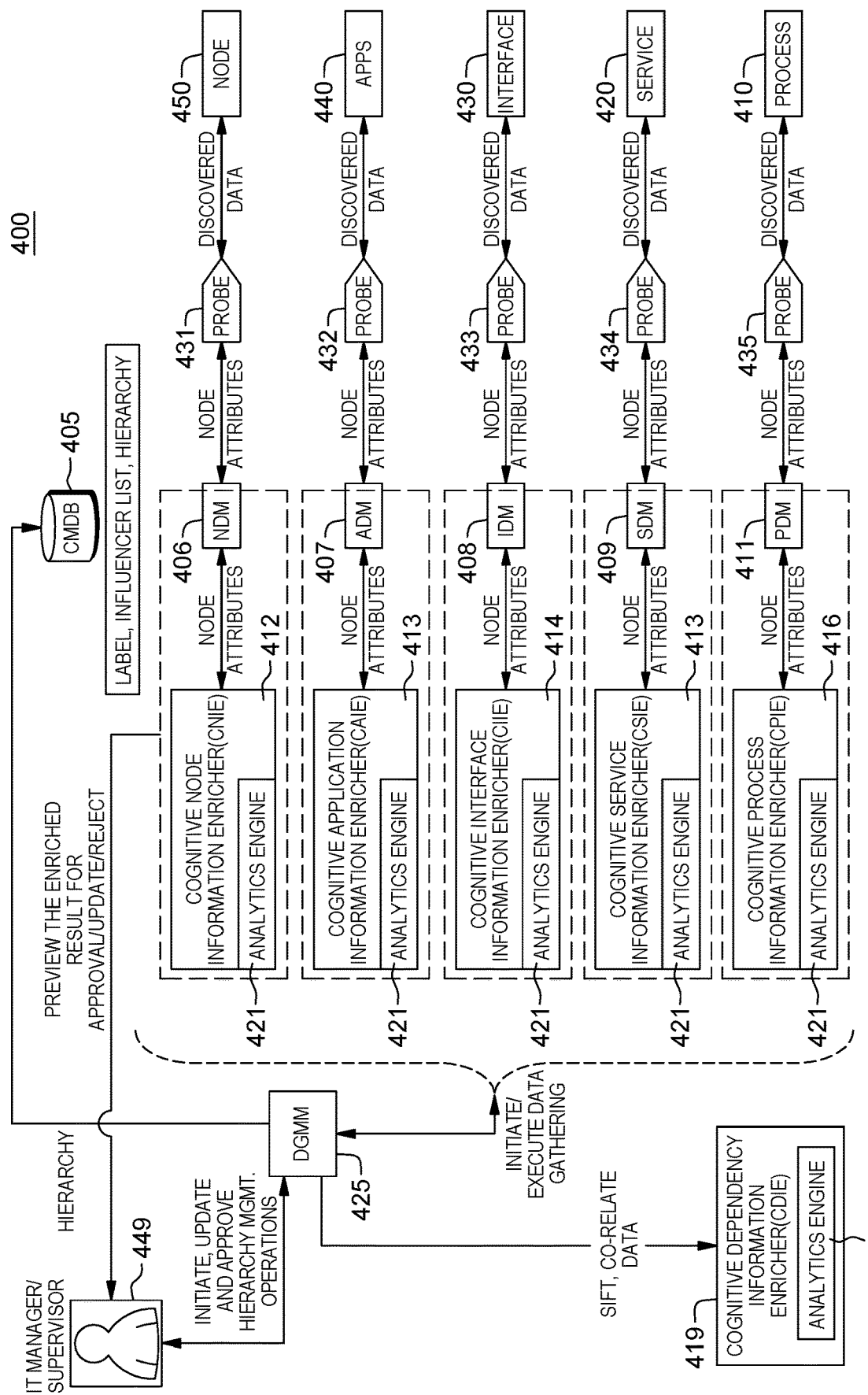
FIG. 4 depicts a technical architecture 400 of various embodiments of the present invention.

FIG. 4 depicts a technical architecture 400 of various embodiments of the present invention. In FIG. 4, various aspects implemented by program code executed by one or more processors are separated into different modules in order to clearly illustrate various functionalities. This depiction is provided for illustrative purposes only as various aspects can be combined and/or separated into different modules and configurations of modules. Hence, FIG. 4 provides an example that enables the user to comprehend these functionalities, only, not to suggest any limitations. The layers of the computing system of FIG. 3 are illustrated in FIG. 4, as well (i.e., node layer 450, application layer 440, interface layer 430, service layer 420, and process layer 410).

Referring to FIG. 4, embodiments of the present invention include an agentless approach for all crawling, discovery, data enrichment and correlation of factors/attributes among various layers in a computer system (i.e., node layer 450, application layer 440, interface layer 430, service layer 420, and process layer 410). Before various aspects of the present invention and the processes associated therewith are reviewed in detail, the illustrated aspects and certain general functionalities are identified. Embodiments of the present invention include a configuration management database (CMDB) 405. Generally speaking, a CMDB is a series of tables containing (in some cases, all) the assets and business services controlled by an entity and the configurations of the assets and services. In embodiments of the present invention, all objects are manually entered as free-text descriptors either in local configuration files, CMDB 405, and/or logs. The CMDB 405 refers to, validates, and stores object and application data. Elements in the CMDB 405 in some embodiments of the present invention include, but are not limited to: 1) a data dictionary of all object and attribute types in the universe (computer system), 2) a reference architecture for use by the cognitive information enrichers (which will be discussed herein), and 3) a hierarchy repository for all correlations (of KPIs) discovered and/or validated by program code in some embodiments of the present invention. The CMDB 405 stores dependencies between the attributes (e.g., labels).

In some embodiments of the present invention, program code executing on one or more processors discovers and analyzes various data in order to generate correlations that comprise the hierarchy (e.g., FIG. 2, 210), the program code enriches the labels (e.g., FIG. 2, 220), and the program code utilizes the enriched labels to generate the hierarchy matrix (e.g., FIG. 2, 230). As illustrated in FIG. 4, the data gathering and analyzing (to generate the correlations and the hierarchy) is initiated by program code comprising a dependency generation master module (DGMM) 419. The program code analyses, identifies, and enriches the labels at the various layers discussed and illustrated in FIGS. 3 and 4. Depending on the layer of the computing system, the sources of the data analysed by the program code is data discovery can vary. Referring to FIG. 4, for example, at the node layer 450, the program code discovers data from one or more of the CMDB 405, configuration files on nodes, readme files on nodes, executing queries on nodes, system log files on nodes, log files of other agents on the nodes (e.g., logs, database of monitoring tools), and/or manual entries/updates. At the application layer 440, the program code can discover data from data sources including, but not limited to, the CMDB 405, configuration files on nodes (e.g., hypertext transfer protocol (HTTP) server, application server, environment variables), readme files on nodes, executing queries on nodes (e.g., running process names), log files on nodes, log files of other agents on nodes, and/or manual entries/updates. At the interface layer 430, the program code can discover data relevant to the attributes (KPI and correlation) from sources including but not limited to the following: a central web services repository, configuration files on nodes (e.g., application programming interface (API) configuration files, data definition language (DDL) and other extensible markup language (XML) files), log files of applications on nodes, log files of other agents on nodes, and/or manual entries/updates. For data discovery at the service layer 420, program code in embodiments of the present invention can obtain/discover data from sources including, but not limited to, the following: a central web services repository (with business and technical services), configuration files on nodes (e.g., API configuration files, DDL and other XML files), application log files on nodes, log files of other agents on nodes, and/or manual entries/updates. The program code in some embodiments of the present invention discovers data at the process layer 410 from one or more of the following data sources: CMDB 405 (with business and technical processes), application log files on nodes, log files of other agents on nodes, and/or manual entries/updates. The program code can discover existing dependencies from sources including, but not limited to the CMDB 405, and manual entries/updates.

Referring to FIG. 4, program code discovers or identifies attributes that correlate with each other and impact KPIs in different layers of the hierarchy by analyzing these various layers (having had the analyses initiated by the program code of the DGMM 419). The illustrated embodiment includes node discovery modules (NDMs) 406 comprising program code to dynamically discover labels for contextual meaning derivation for generating correlation and quality attributes for multiple influencer types for the node layer 450 in a computing system. Application discovery modules (ADMs) 407 comprise program code to dynamically discover labels for contextual meaning derivation for generating correlation and quality attributes for multiple influencer types for the application layer 440 in a computing system. Interface discovery modules (IDMs) 408 comprise program code to dynamically discover labels for contextual meaning derivation for generating correlation and quality attributes for multiple influencer types for the interface layer 430 in a computing system. Service discovery modules (SDMs) 409 comprise program code to dynamically discover labels for contextual meaning derivation for generating correlation and quality attributes for multiple influencer types for the service layer 420 in a computing system. Business process discovery modules (PDMs) 411 comprise program code to dynamically discover labels for contextual meaning derivation for generating correlation and quality attributes for multiple influencer types for the process layer 410 in a computing system. As aforementioned, this separation of functionalities into different modules is provided as an example and for illustrative purposes, only, and does not represent any limitations insofar as the grouping of various functionalities of the program code in embodiments of the present invention into certain frameworks.

In addition to program code discovering labels for contextual meaning derivation and for generating correlations, program code in embodiments of the present invention, at each layer of a computing system, validates and enriches discovered labels (e.g., FIG. 2, 220). At the node level, program code comprising a cognitive node information enricher (CNIE) 412 validates and enriches the data of node labels. Labels can be understood as attributes. Program code comprising a cognitive application information enricher (CAIE) 413 validates and enriches data for application labels. Program code comprising a cognitive interface information enricher (CIIE) 414 validates and enriches data for interface labels. Program code comprising a cognitive service information enricher (CSIE) 415 validates and enriches data for service labels. Program code comprising a cognitive process information enricher (CPIE) 416 validates and enriches data for business process transaction labels. Finally, in the illustrated embodiment, program code comprising a cognitive dependency information enricher (CDIE) 419 maps relationship validation and data enrichment from the various enrichment modules. As illustrated in FIG. 4, program code comprising the various enrichment modules utilize and/or comprise an analytics engine. The analytics engine can be one or more engines and/or a single shared engine. In the depicted technical environment 400, the analytics engine 421 utilized by program code comprising the various enrichment modules 412, 413, 414, 415, 416, and 419, access a shared analytics engine 421.

As aforementioned, program code in embodiments of the present invention generates a dependency hierarchy (e.g., FIG. 2, 230). The program code not only generates this hierarchy, which is stored in the CMDB 405, but the program code also continually increments the data (knowledge) comprising the dependency hierarchy. Tuning this dependency hierarchy enables the anticipation of KPI events because there is an understanding of the dependencies of resources of different layers of a computing system on each other and thus, collectively, on different KPI measures. Aspects of the process executed by the program code to increment the data (knowledge) comprising the dependency hierarchy are illustrated as a workflow 500 in FIG. 5. For illustrative purposes only, throughout the workflow 500 of FIG. 5, elements of FIG. 4 are referenced.

Figure 5:
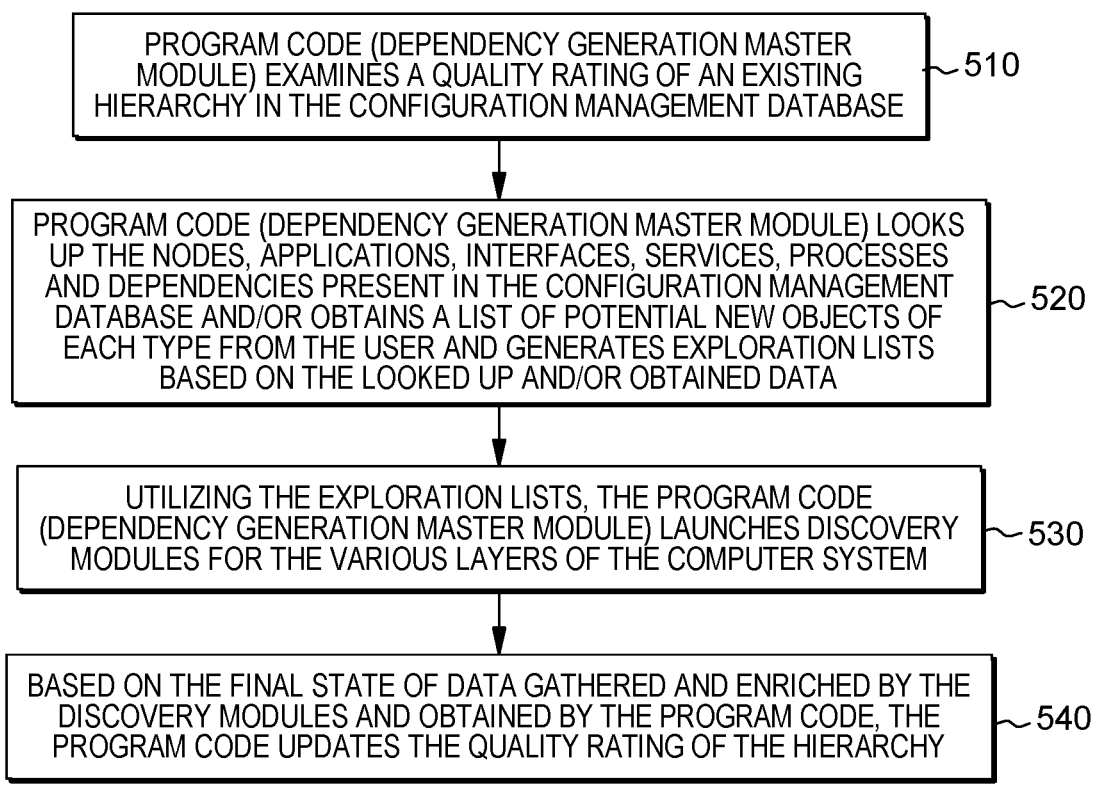
FIG. 5 is a workflow that depicts aspects of the process executed by the program code in embodiments of the present invention to increment data (knowledge) comprising a dependency hierarchy.
Figure 6:
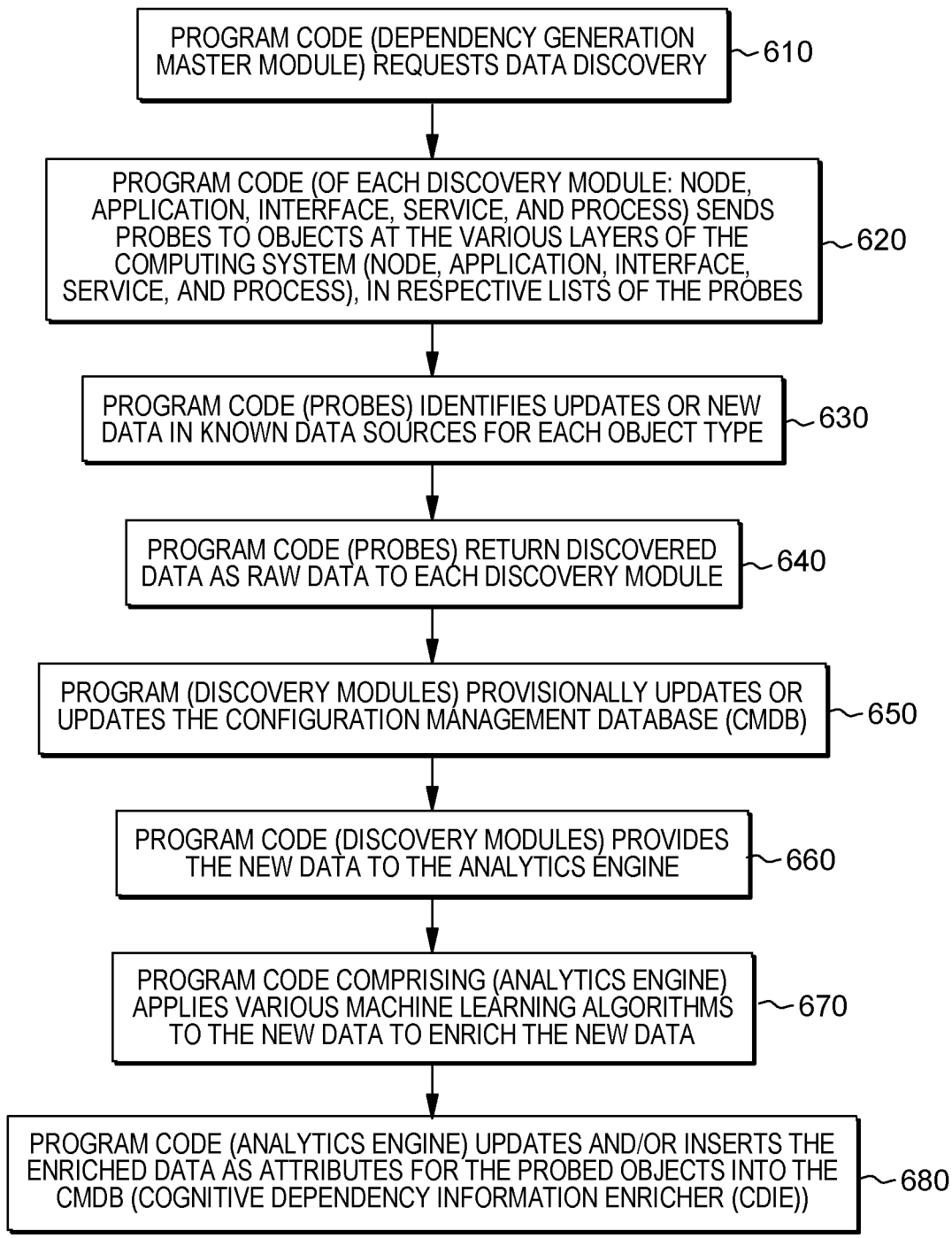
FIG. 6 is a workflow that depicts aspects of program code in some embodiments of the present invention initiating and executing data gathering from the layers of a computer system in order to generate and/or update a hierarchy matrix of attributes.

Referring to FIG. 5, program code of the DGMM 425 examines a quality rating of the existing hierarchy (in the CMDB 405) (510). Based on determining that the rating is below a specified threshold, in some embodiments of the present invention, the program code sends a request to a user (e.g., supervisor) via a computing device 449 utilized by the user, for approval to increment the data comprising the hierarchy. In some embodiments of the present invention, based on determining that the rating is below a specified threshold, the program code automatically starts a process to increment the data of the hierarchy which is illustrated in FIG. 5. Based on determining that the rating is below a specified threshold, the program code of the DGMM 425 looks up the nodes, applications, interfaces, services, processes and dependencies present in the CMDB and/or obtains a list of potential new objects of each type from the user and generates exploration lists based on the looked up and/or obtained data (520). In embodiments where approval is requested, the program code obtains the data and generates the exploration lists, based on receiving user approval. Utilizing the exploration lists, the program code of the DGMM 425 launches the discovery modules for the various layers of the computer system (i.e., NDM 406, ADM 407, IDM 408, SDM 409, and PDM 411) (530). FIG. 6 depicts a workflow 600 of the data discovery by the discovery modules and probes (i.e., probes 431, 432, 433, 434, 435) launched/called by each discovery module.

Returning to FIG. 5, based on the final state of data gathered and enriched by the discovery modules (which launch probes that utilize the exploration lists) and obtained by the DGMM 425 and the analytical engine 421, the program code updates the quality rating of the hierarchy (540). The program code can utilize an algorithm, which is discussed herein, to determine the quality rating. In some embodiments of the present invention, the program code of the DGMM 425 sends the quality rating to the user 449 for approval. In some embodiments of the present invention, program code of the DGMM 425 regularly reduces the quality rating with the passage of time (as per an algorithm) based on the amount of time that passes and the nature of changes requested on the systems in the landscape since the time the DGMM 425 utilized by the discovery modules to update the hierarchy data.

FIG. 6 is a workflow 600 that illustrates the process of program code comprising the DGMM 425 (FIG. 4), in some embodiments of the present invention, initiating and executing data gathering from the layers of the computer system in order to generate and/or update the hierarchy matrix of attributes (correlation and KPI). For illustrative purposes, throughout the workflow 600, references will be made to aspects of FIG. 4. In some embodiments of the present invention, the program code of the of the DGMM 425 requests data discovery (610). Based on the request, the program code of each discovery module (i.e., NDM 406, ADM 407, IDM 408, SDM 409, and PDM 411) sends probes (i.e., probes 431, 432, 433, 434, 435) to objects at the various layers of the computing system (i.e., node 450, application 440, interface 430, service 420, and process 410), including both new and old objects in respective lists of the probes (620) (e.g., exploration lists of FIG. 5). The program code of the discovery modules can send the probes in parallel. In some embodiments of the present invention, the lists utilized by each probe are stored in the CMDB 405. The program code of the DGMM 425 can obtain these lists from the CMDB 405 prior to initiating the data discovery by the probes.

Returning to FIG. 6, program code comprising the probes (i.e., probes 431, 432, 433, 434, 435) identifies updates or new data in known data sources for each object type (630). The object types are discussed below and the data sources for each layer were discussed above. The program code comprising the probes (i.e., probes 431, 432, 433, 434, 435) return to each discovery module (i.e., NDM 406, ADM 407, IDM 408, SDM 409, and PDM 411) discovered data as raw data (640). The program code of the discovery modules (i.e., NDM 406, ADM 407, IDM 408, SDM 409, and PDM 411) provisionally updates or updates the CMDB 405 (650). In some embodiments of the present invention, the discovery modules (i.e., NDM 406, ADM 407, IDM 408, SDM 409, and PDM 411), in addition to provisionally updating the CMDB 405, the program code comprising the discovery modules also sends the new data (new information for their respective object types) to a computing device utilized by a user (e.g., operator or administrator) 449 for updates and/or approvals. Based on feedback provided by the user via the computing device 449, the program code of the discovery modules (i.e., NDM 406, ADM 407, IDM 408, SDM 409, and PDM 411) provides the (now finalized) data to the analytics engine 421. Thus, in embodiments of the present invention, the program code of the discovery modules (i.e., NDM 406, ADM 407, IDM 408, SDM 409, and PDM 411) provides the new data to the analytics engine 421 (660). In some embodiments of the present invention where user approval is not sought, rather than provisionally updating the CMDB 405, the program code automatically updates CMDB 405.

The program code comprising the analytics engine 421 applies various machine learning algorithms to the new data to enrich the new data (670). The machine learning includes applying analytical methods, including but not limited to text analytics, natural language processing, and/or statistical modelling (e.g., regression, classification, decision trees, etc.). The program code of the analytics engine 421 updates and/or inserts the enriched data as attributes for the probed objects into the CMDB 405 via the CDIE 419 (680). As illustrated in FIG. 4, the CDIE 419 sifts and correlates the data for insertion into the CMDB 405. In some embodiments of the present invention, the analytics engine 421 provides these updates (i.e., changes in the object attribute data) to the user 449, for approval, and the approved changes are inserted into the CMDB 405. The operations of the CDIE 419 are illustrated in FIG. 7.

Figure 7:
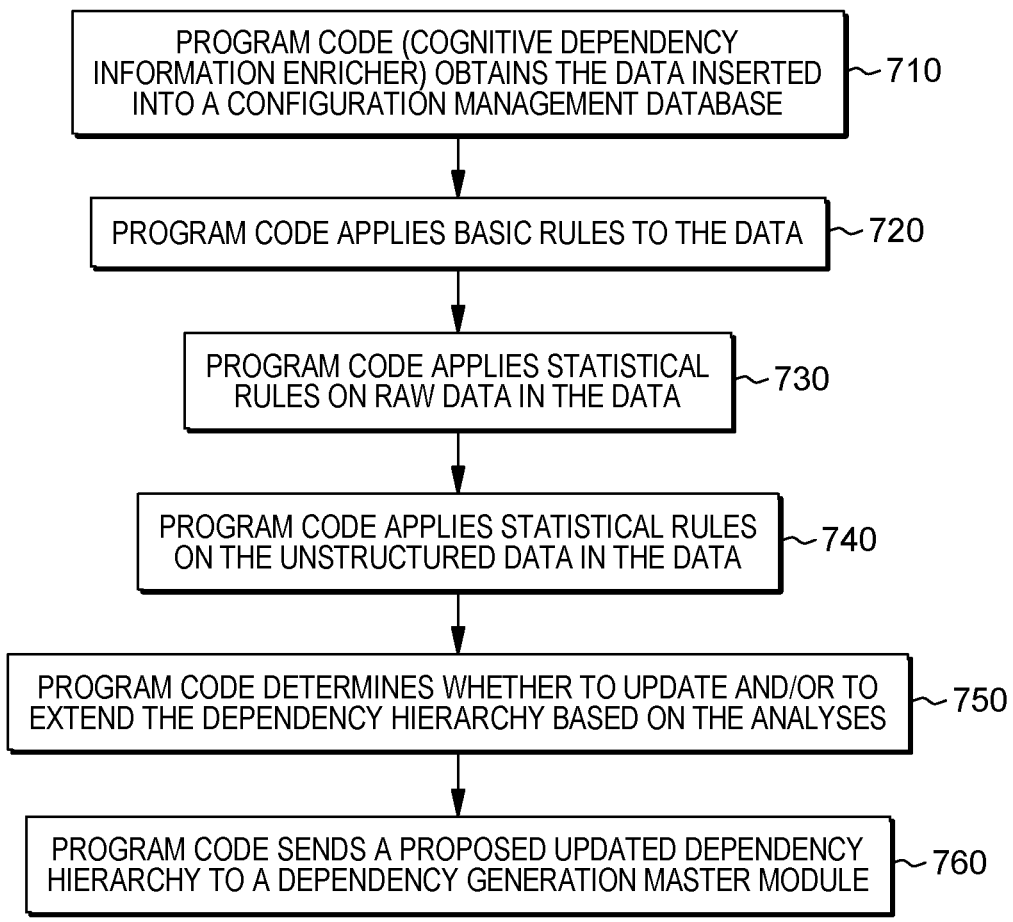
FIG. 7 is a workflow that depicts aspects of the operation of program code in dependency (hierarchy) data discovery and enrichment in embodiments of the present invention.

FIG. 7 is a workflow 700 that illustrates the operation of program code comprising the CDIE 419 in various embodiments of the present invention and the role of this program code in dependency (hierarchy) data discovery and enrichment. As depicted in FIG. 6, the program code of the analytics engine 421 updates and/or inserts the enriched data as attributes for the probed objects into the CMDB 405 via the CDIE 419 (680). Turning to FIG. 7, in some embodiments of the present invention, the program code of the CDIE 419 assembles the data inserted into the CMDB 405 and analyses the data to update and/or to extend the dependency hierarchy. In the analysis, program code of the CDIE 419 applies various analytical modelling methods, including but not limited to, text analytics, natural language processing, and/or statistical modelling (e.g., regression, classification, decision trees, etc.). The program code of the CDIE 419 obtains the data inserted into the CMDB 405 (710) and applies basic rules to the data (720). The program code applies statistical rules on raw data in the data (730). The program code applies statistical rules on the unstructured data in the data (740). The program code determines whether to update and/or to extend the dependency hierarchy based on the analyses (750). Based on determining that the dependency hierarchy should be updated and/or extended, the program code sends a proposed updated dependency hierarchy to the DGMM 425 (760). In some embodiments of the present invention, the program code of the DGMM 425 notifies the user 449 of the updates and in some embodiments, the program code requests an approval of the updates from the user 449.

Certain aspects of some embodiments of the present invention are illustrated by a combination and FIGS. 3-4. As illustrated in FIGS. 3-4, at each layer, the program code discovers (and enriches) correlation attributes and KPI attributes. In some embodiments of the present invention, program code identifies and provides correlation (dependency) attributes 311, 321, 331, 341, 351 first then the KPI attributes 312, 322, 332, 342, 352. In the examples and illustrations discussed, TPS refers to transactions per second, TPH refers to transactions per hour, Count is a numeric sum, DollarsPerDay is a measure of revenue, in this case in the currency of dollars of revenue, per day, Domain is a logical business area at an enterprise level comprising a set of closely related functions, and Sub-Domain refers to a logical business area at a domain level comprising a set of closely related functions.

Referring to FIG. 3, at the node layer 350, the program code identifies the correlation attributes 351 and the KPI attributes 352 and stores them in the CMDB 405 (FIG. 4). Examples of correlation attributes 351 for the node layer 350 can include but are not limited to: 1) NodeType, NodeSubtype, NodeLabel; 2) IncomingInterfaceType, IncomingInterfaceLabel1 . . . N; 3) OutgoingInterfaceType, OutgoingInterfaceLabel1 . . . N; 4) ConsumingApplicationType, ConsumingApplicationLabel1 . . . N. The program code also stores KPI attributes 352 in the CMDB 405 (FIG. 4). These attributes can include but are not limited to KPIType1 . . . N, KPILabel1 . . . N, KPILowRangeParameterValue1 . . . N, and KPIHighRangeParameterValue1 . . . N. Types of nodes in a computer system at the node layer 350 can include, but are not limited to, compute nodes, storage nodes, and/or network nodes. A given computing system in which aspects of some embodiments of the present invention are implemented can also include storage node subtypes, including but not limited to: local, storage area network (SAN), network file system (NFS), and/or Chef. Network node subtypes can include, but are not limited to: switch, router, gateway, domain name server (DNS), load balancing (LB), proxy, and/or firmware (FW). Below is an example of a computation of a given internal KPI object at a node layer 350 (given the examples of the node types):

Compute, NIL, RechargeAppNode
NIC, 192.168.1.1:80, 192.168.1.2:80 (Incoming)
NIC, 172.28.32.1:2001 (Outgoing)
Sales, PrePaidRechargeTelcoXNorthApp, PrePaidRechargeTelcoXWestApp
%, CPU1AverageUtil, 80,90; CPU2AverageUtil, 50,60 (Possible Node Types: Compute, Storage, Network. Storage Node Subtypes: Local, SAN, NFS, Chef. Network Node Subtypes: Switch, Router, Gateway, DNS, LB, Proxy, FW)

As illustrated in FIG. 3, the application layer 340 can also be understood as the deployment layer of a computing system. Types of applications deployed at the application layer 340 of a computing system can include, but are not limited to, online transaction processing (OLTP), batch, and/or compound. Examples of correlation attributes 341 at this layer can include, but are not limited to: 1) AppDomain, AppSubDomain, AppType, AppLabel; 2) IncomingInterfaceType, IncomingInterfaceLabel1 . . . N; and/or 3) OutgoingInterface Type, OutgoingInterfaceLabel1 . . . N. Examples of KPI attributes 342 at the application layer 340 can include, but are not limited to: KPIType1 . . . N, KPILabel1 . . . N, KPILowRangeParameterValue1 . . . N, KPIHighRangeParameterValue1 . . . N. Below are KPI example objects at the application layer 340.

Sales, Recharge, OLTP, PrepaidRechargeApp
Read, GetLastRechargeInt
Read, GetRechargeOptionsInt
Count, PrepaidRechargeAppImages, 2, 20; Count, PrepaidRechargeAppTotalThreads, 5,500; PrepaidRechargeAppAverageThreads, 250,260; TPS, GetLastRechargeIntTPS, 0,1000; TPS, GetRechargeOptionsInt, 0, 100

Embodiments of the present invention discover and enrich attributes at the interface layer 330. Interfaces at this layer can include, but are not limited to read, write, and/or compound. Exampled of correlation attributes 331 at the interface layer 330 can include, but are not limited to: InterfaceType, InterfaceLabel, InterfaceFromAppLabel, InterfaceToAppLabel1 . . . N. Examples of KPI attributes 332 at the interface layer 330 can include, but are not limited to: KPIType1 . . . N, KPILabel1 . . . N, KPILowRangeParameterValue1 . . . N, and/or KPIHighRangeParameterValue1 . . . N. Example of KPI objects at the interface layer 330 can include, but are not limited to, the example below:

Read, GetLastRechargeInt, PrepaidRechargeApp, CRM, SMSApp, IVRApp, OBDApp, WebPortalApp, MobileApp TPS, DoRechargeIntAverageTPS, 0,1000; TPS, GetRechargeIntOptions, 0, 100

The program code in embodiments of the present invention also discovers correlation attributes 321 and KPI attributes 322 at the servicer layer 320. Services can include business as well as technical services. Correlation attributes 321 can include, but are not limited to, the following examples: 1) ServiceType, ServiceLabel; 2) ServiceDomainLabel1 . . . N, ServiceSubDomainLabel1 . . . N; 3) ServiceProcessLabel1 . . . N, ServiceSubProcessLabel1 . . . N. KPI attributes 322 can include, but are not limited to: KPIType1 . . . N, KPILabel1 . . . N, KPILowRangeParameterValue1 . . . N, KPIHighRangeParameterValue1 . . . N. Below are examples of KPI objects at the service layer 320.

Business, PrepaidRechargeSvc
    SalesDom, PrepaidSalesSubDom
    SalesProcCollection, PrepaidSalesProcCollection
    TPH, MinPrepaidRechargeSvcPerHour, 0,0; TPH, MaxPrepaidRechargeSvcPerHour, 30,000, 40,000; TPH, AveragePrepaidRechargeSvcPerHour, 15000,20000

Program code in embodiments of the present invention also discovers attributes at the (business) process layer 310. Processes at this layer can include, but are not limited to sub-processes with business and technical transaction types. Correlation attributes 311 at the process layer 310 can include, but are not limited to, the following examples: 1) ProcessType, ProcessLabel; 2) SubProcessType, SubProcessLabel; 3) TransactionType, TransactionLabel; and/or 4) ProcessDomainLabel, ProcessSubDomainLabel. KPI attributes 312 at the service layer 310 can include, but are not limited to: KPIType1 . . . N, KPILabel1 . . . N, KPILowRangeParameterValue1 . . . N, KPIHighRangeParameterValue1 . . . N. Below are examples of KPI objects at the service layer 310.

Business, SalesCollectionProc
    Business, PrepaidSalesCollectionSubProc
    Business, PrepaidRechargeTransaction
    SalesDom, PrepaidSalesSubDom
    DollarsPerDay, PrepaidSalesCollectionProcDollarsPerDay, 1300000, 2600000Algorithms for Gathering Empirical Data and Analytical (Deductive) Enrichment As discussed in reference to FIGS. 4-6, discovery modules return raw data to the DGMM 405 (FIG. 4). The program code of the enrichment modules, enriches this data. Below is an illustrative example of raw data that can be returned by the NDM 406 and enriched by the CNIE 412. For example, raw data that can be returned by the NDM 406 is listed below.

Node Type: Compute
    Node Sub-Type: CMDB: Not Found, System Query: Intel, System Query: RHEL
    NodeLabel: CMDB: Not Found, System Query: RechargeAppNode
    IncomingInterface Type: CMDB: Not Found, System Query: NIC 10 Gbps
    Incoming InterfaceLabel: CMDB: Not Found, System Query: 192.168.1.1 Port 80, 192.168.1.2 Port 80
    OutgoingInterface Type: CMDB: Not Found, System Query: NIC 10 Gbps
    Outgoing InterfaceLabel: CMDB: Not Found, System Query: 172.28.32.1 Port 2001
    ConsumingApplicationType: CMDB: Not Found, APM Logs: Domain-Sales
    ConsumingApplicationLabel: CMDB: Not Found, System Query: PrepaidRechargeN, PrepaidRechargeW, APM Logs: RechargeTelcoXNorthApp, PrePaidRechargeTelcoXWestApp
    System Query, CPU1AverageUtil, 80,90; CPU2AverageUtil, 50,60 on Jan. 2, 2018
    System Query, CPU1AverageUtil, 81,89; CPU2AverageUtil, 55,59 on Jan. 2, 2018
    System Query, CPU1AverageUtil, 0,10; CPU2AverageUtil, 48,62 on Jan. 2, 2018
    System Query, CPU1AverageUtil, 86,99; CPU2AverageUtil, 5,40 on Jan. 2, 2018
    System Query, CPU1AverageUtil, 77,79; CPU2AverageUtil, 80,84 on Jan. 2, 2018
    APM logs, CPU1 Utilization graphs found, CPU2 Utilization graphs found
    WAS Server Readme file, Ensure DB SID updates for RAC for PrepaidCustomerActiveStateCheck service to ensure performance of DoPrepaidRecharge service
    APM logs, PrepaidCustomerActiveStateCheck, 3 mS, DoPrepaidRechargeDBCall, 40 mS
    APM logs, PrepaidCustomerActiveStateCheck, 4 mS, DoPrepaidRechargeDBCall, 100 mS
    APM logs, PrepaidCustomerActiveStateCheck, 2 mS, DoPrepaidRechargeDBCall, 7 mS
    APM logs, PrepaidCustomerActiveStateCheck, 7 mS, DoPrepaidRechargeDBCall, 32 mS Referring to FIG. 4, the CNIE 412 can take various passes in order to enrich the data. At a first pass (e.g., FIG. 7, 720), in some embodiments of the present invention, the program code of the CNIE 412 performs a rule operation for ConsumingApplicationLabel. The program code takes the label values from System Query and APM Logs, checks for conflicts, and if none exist, merges into the largest string: PrepaidRechargeN+RechargeTelcoXNorthApp=PrepaidRechargeTelcoNorthApp.

As a second pass (e.g., FIG. 7, 730), in some embodiments of the present invention, the CNIE 412 utilizes the program code of the analytics engine generates a Statistical Model for CPUnAverageUtil. To this end, the program code takes all the values over the time period and performs a regression analysis: CPU1AverageUtil daily range=82-88%, CPU2AverageUtilDailyRange=53-63%.

As a third pass (e.g., FIG. 7, 740), the program code of the CNIE 412 performs a cognitive analysis. The program code determined Observed New Input, Cognition Type to determine whether to add a rule. The program code adds a rule if a CPU Utilization data pattern is detected in a previously unidentified data source. The program code then creates a rule to use it. The program code creates this rule for a CNIE Analytics Pass. The program code takes the data that is more extensive in time and more frequent in sampling between query data and APM log data.

Returning to FIG. 4, as mentioned earlier, the program code of the CDIE 419 uses object data (returned by the enrichers and the probes, via the DGMM 425, to find dependencies between objects at all the layers (node 450, application 440, interface 430, service 420, and process 410), from top to bottom (i.e., business process to nodes). Below is an example of input data then look and methods applied by the program code of the CDIE 419 to extract information.

Below is an example of node data (data obtained via a probe 431 from a node layer 450). This example is offered for illustrative purposes only.

Node Data:
    Compute, NIL, RechargeAppNode
    NIC, 192.168.1.1:80, 192.168.1.2:80 (Incoming)
    NIC, 172.28.32.1:2001 (Outgoing)
    Sales, PrePaidRechargeTelcoXNorthApp, PrePaidRechargeTelcoXWestApp %, CPU1AverageUtil, 80,90; CPU2AverageUtil, 50,60
%, Mem1AverageUtil, 40; Mem2AverageUtil 60
%, Mem1AverageUtil, 36; Mem2AverageUtil, 77

WAS Server Readme file, "Ensure DB SID updates for RAC for PrepaidCustomerActiveStateCheck service to ensure performance of DPrepaidRechargeService service"

APM logs, PrepaidCustomerActiveStateCheck, 3 mS, DoPrepaidRechargeDBCall, 40 mS

APM logs, PrepaidCustomerActiveStateCheck, 4 mS, DoPrepaidRechargeDBCall, 100 mS APM logs, PrepaidCustomerActiveStateCheck, 2 mS, DoPrepaidRechargeDBCall, 70 mS APM logs, PrepaidCustomerActiveStateCheck, 7 mS, DoPrepaidRechargeDBCall, 150 mS Below is an example of application data (data obtained via a probe 432 from an application layer 440). This example is offered for illustrative purposes only.

Application Data:
Sales, Recharge, OLTP, PrepaidRechargeApp
Read, GetLastRechargeInt
Read, GetRechargeOptionsInt
Count, PrepaidRechargeAppImages, 2, 20; Count, PrepaidRechargeAppTotalThreads, 5,500; PrepaidRechargeAppAverageThreads, 250,260; TPS, GetLastRechargeIntTPS, 0,1000; TPS, GetRechargeOptionsInt, 0, 100

Below is an example of interface data (data obtained via a probe 433 from an interface layer 430). This example is offered for illustrative purposes only.

Interface Data:
Read, GetLastRechargeInt, PrepaidRechargeApp, CRM, SMSApp, IVRApp, OBDApp, WebPortalApp, MobileApp
Write, DoRechargeInt, PrepaidRechargeApp, CRM, SMSApp, IVRApp, OBDApp, WebPortalApp, MobileApp
TPS, DoRechargeIntAverageTPS, 0,1000; TPS, GetRechargeIntOptions, 0, 100

Below is an example of service data (data obtained via a probe 434 from a service layer 420). This example is offered for illustrative purposes only.

Service Data:
Business, PrepaidRechargeService
SalesDom, PrepaidSalesSubDom
SalesProcCollection, PrepaidSalesProcCollection
TPH, MinPrepaidRechargeSvcPerHour, 0,0; TPH, MaxPrepaidRechargeSvcPerHour, 30,000, 40,000; TPH, AveragePrepaidRechargeSvcPerHour, 15000,20000

Below is an example of business process data (data obtained via a probe 435 from a process layer 410). This example is offered for illustrative purposes only.

Business Process Data
Business, SalesCollectionProc
Business, PrepaidSalesCollectionSubProc
Business, PrepaidRechargeTransaction
SalesDom, PrepaidSalesSubDom
DollarsPerDay, PrepaidSalesCollectionProcDollarsPerDay, 1300000, 2600000

Figure 8:
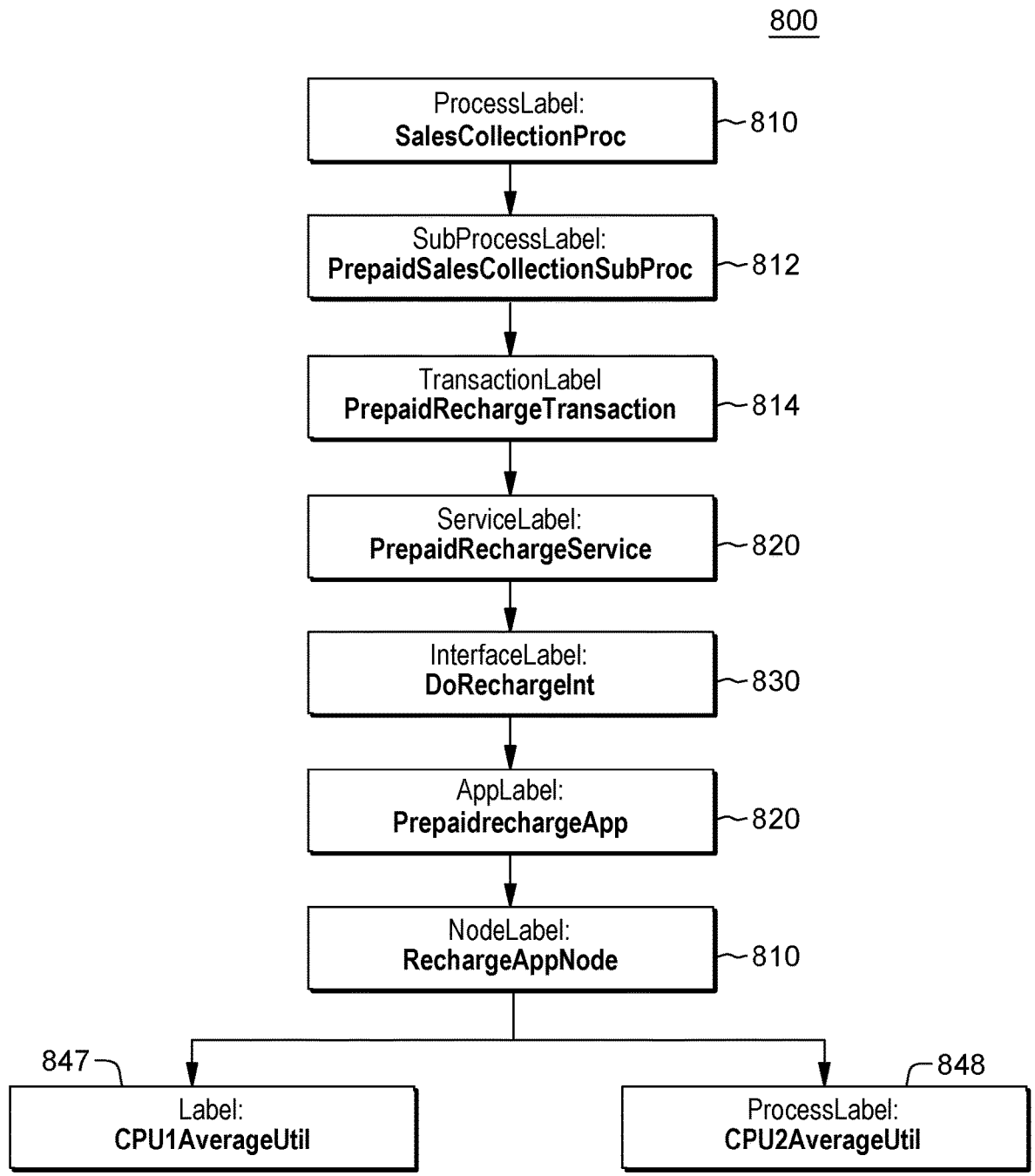
FIG. 8 is an example of a tree generated by program code in accordance with various aspects of some embodiments of the present invention.

At a first pass (e.g., FIG. 7, 720), in some embodiments of the present invention, the program code of the CDIE 419 performs a rules (engine) operation. The program code, in some embodiments of the present invention, applies a rule for new dependency and chain creation. The program code of the CDE 419 generates a path through the dependency hierarchy tree by joining objects to correlate attributes. Continuing with the example of the data provided above for the various layers, program code of the CDE 419 generated the path through the dependency hierarchy tree by joining the following object correlation attributes: NodeLabel, ConsumingAppLabel, IncomingInterfaceLabel, OutgoingInterfaceLabel, InterfaceFromAppLabel, InterfaceToAppLabel, ServiceLabel, ProcessLabel, SubProcessLabel, TransactionLabel. FIG. 8 is an example of a tree 800 generated by the program code in accordance with this example. The illustration is a partial depiction, for this particular dependency chain data in this illustration. As understood by one of skill in the art, the program code of the CDE 419 generates a tree with many more branches, with increasing numbers from the sub-process level. However, for ease of understanding, FIG. 8 is provided to understand a simple (non-limiting and incomplete) example. As seen in FIG. 8, the program code has generated a tree to represent correlations between certain labels (attributes) at the various layers of a computing system. In this case, at the process layer 810 (including the sub-processes 812 and transactions 814), SalesCollectionProc, PrepaidSalesCollectionSubProc, and PrepaidRechargeTransaction, correlate with the attribute PrepaidRechargeService at the service layer 820, DoRechargeInt at the interface layer 830, PrepaidRechargeApp at the application layer 820, and RechargeAppNode 810 at the node layer 810. These attributes are determinative of the KPI related to CPU utilization, as represented by the correlation attribute 847 CPU1AverageUtil and the KPI attribute 848 CPU2AverageUtil.

Figure 9:
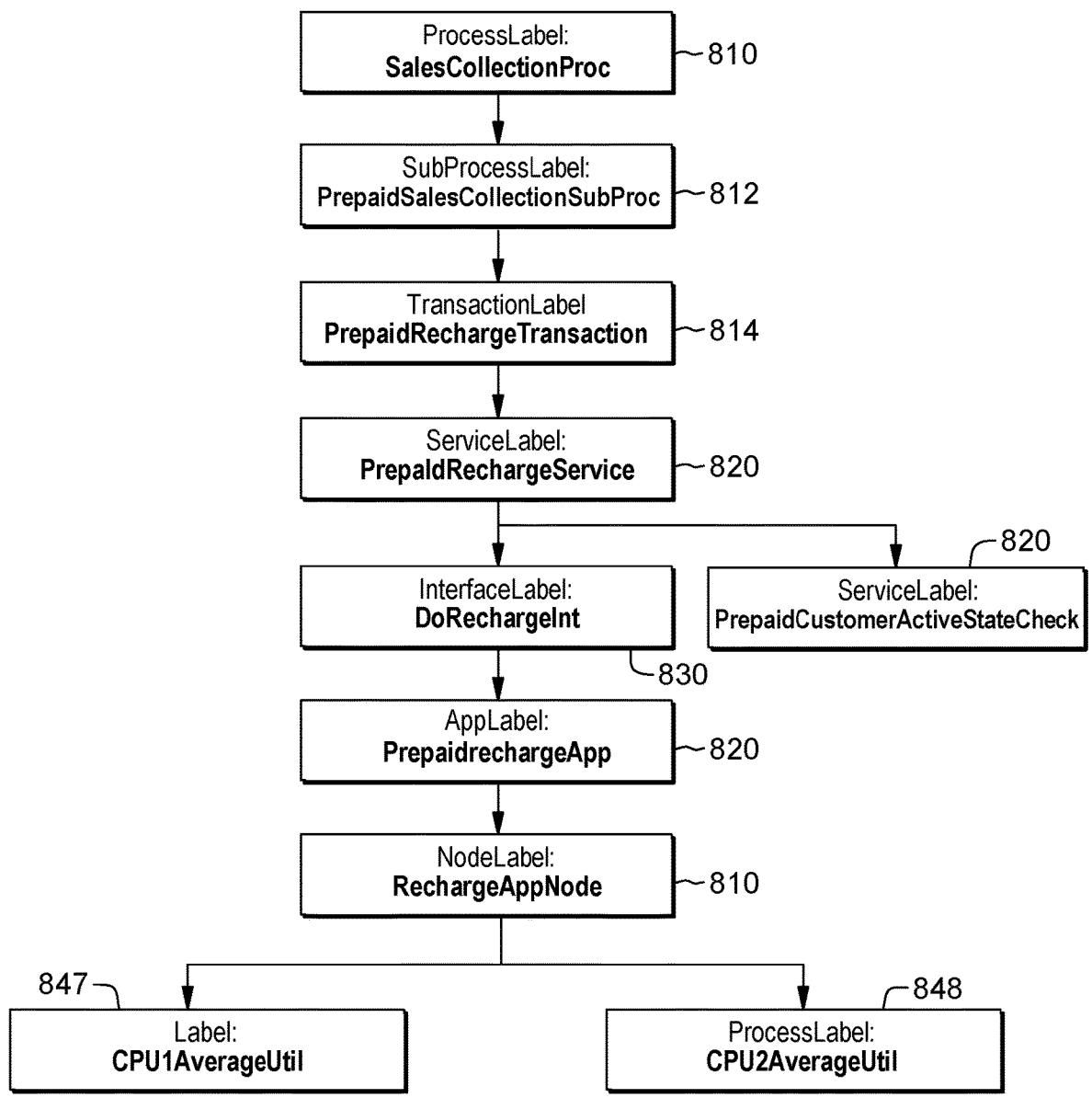
FIG. 9 is an example of a tree generated by program code in accordance with various aspects of some embodiments of the present invention.

In some embodiments of the present invention, the program code of the CDE 419 takes a second pass (e.g., FIG. 7, 730, 740) and applies a statistical model (e.g., utilizing an analytics engine 421) to find missing dependencies. Using the present example, as this second pass, the program code performs a textual analysis on all the data to find any correlations through string matches that could indicate dependencies between two objects and therefrom update the entire dependency chain. In order to make these connections, the program code can analyze data sources including, but not limited to readme files and APM log text strings in the node data (including the node data provided as an example above). Based on this analysis, in the present example, by applying textual analytics, the program code of the CDE 419 adds a new dependency to the tree 800 of FIG. 8 for the attribute PrepaidRechargeService, which is also an attribute at the service layer 820, resulting in the tree 900 of FIG. 9. For ease of understanding, all the elements labeled in FIGS. 8-9 share many element labels.

Figure 10:
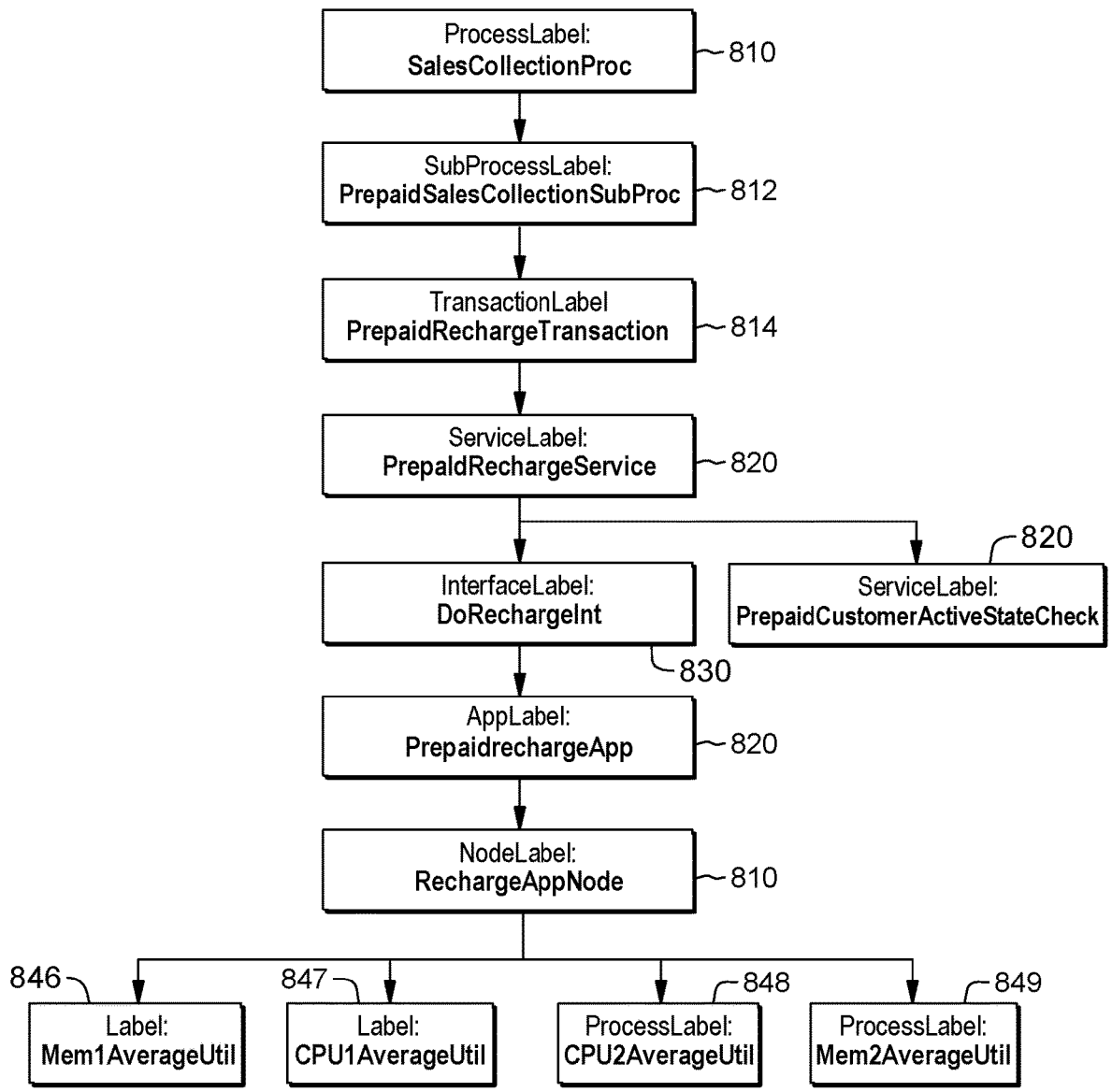
FIG. 10 is an example of a tree generated by program code in accordance with various aspects of some embodiments of the present invention.

In some embodiments of the present invention, the program code of the CDE 419 takes a third pass (e.g., FIG. 7, 750) and cognitively analyzes the data. In this example, the program code observes a difference in a dependency tree of other processes (e.g., cognition type). The program code adds a rule and/or observation based on observing that other trees show a dependency on memory utilization. Thus, the program code adds a dependency of a node on memory utilization. FIG. 10 below is the updated tree 1000 with this change, implemented by the program code. As illustrated in FIG. 10, the memory utilization dependencies 846, 849 have been added by the program code to the tree generated by the program code.

Returning to FIG. 2, in embodiments of the present invention, the program code utilizes the discovered and enriched labels and the generated hierarchy to cognitively self-tune the computer system for quality, efficiency and cost optimization of technology-based business processes (240). As such, the program code references the hierarchy to anticipate issues with a given KPI. For example, in some embodiments of the present invention, if the program code determines that a given KPI has gone outside of a bounded pre-defined value or range, the program code designates (e.g., marks) a relevant influencer object. In some embodiments of the present invention, the program code will present marked objects to a user through an interface on a computing device (e.g., FIG. 4, 449). The program code can generate a graphical user interface in the computing device and in the graphical user interface, the program code marks the objects in a manner that draws attention (e.g., in amber or red) to notify the user (e.g., operator). In the generated interface, in some embodiments of the present invention, the user can drill down to see the cause of the anomaly and launch the pre-defined process to rectify the issue. In some embodiments of the present invention, the program code identifies the object and automatically launches the pre-defined process to rectify the issue. In some embodiments of the present invention, through the generated interface, the program code enables a user to monitor the system actively until the influencer object status has gone back to healthy. A healthy object can be represented to the user through the interface in a manner that indicates health, including, but not limited, to displaying the object in green.

Embodiments of the present invention include a computer-implemented method, a computer program product, and a computer system, where program code executing on one or more processors obtains, from a data source, a list of objects at different layers of a computing system, where the layers comprise nodes, applications, interfaces, services, and processes. The program code generates exploration lists from the list, where each exploration list comprises objects for a given layer of the computing system. The program code identifies, based on utilizing the exploration lists, updated data and new data at each of the layers, where the updated data and the new data are associated with the objects comprising the list, where the identified data comprises attributes for each layer. The program code applies one or more machine learning algorithms to the identified data to enrich the updated data and the new data by identifying dependencies between one or more groups of the attributes for each layer, where each group of the one or more groups comprises influencers for one or more key performance indicators of the computing system. The program code generates, from the enriched data, a hierarchy matrix, where the hierarchy matric comprises trees representing each group of the one or more groups. The program code determines, based on the hierarchy matrix that an event associated with one or more computing resources of the computing system will influence a particular key performance indicator.

In some embodiments of the present invention, the program code mitigates the influence of the one or more computing resources on the particular key performance indicator by taking an action, the action selected from the group consisting of: notifying a user, via a graphical user interface of a computing device of the computing system, of the determination and automatically implementing a pre-defined mitigation action in the computing system.

In some embodiments of the present invention, the program code stores the hierarchy matrix in the data source.

In some embodiments of the present invention, the program code stores the hierarchy matrix by inserting the enriched data as attributes for the objects comprising the list.

In some embodiments of the present invention, the one or more machine learning algorithms are selected from the group consisting of: text analytics, natural language processing, and statistical modelling.

In some embodiments of the present invention, the program code generates the hierarchy matrix by: performing a rules operation on the updated data and the new data; applying analytics on the updated data and the new data, where the analytics comprise a textual analysis, to generate a statistical model; and performing a cognitive analysis on the updated data and the new data.

In some embodiments of the present invention, the program code transmits the hierarchy matrix to a user, via a graphical user interface. The program code obtains feedback on the hierarchy matrix from the user. In some embodiments of the present invention, the program code automatically updating a portion of the hierarchy matrix, based on the feedback.

In some embodiments of the present invention, the program code determines that the hierarchy matrix is below a given quality threshold. Based on the determining, the program code obtains, from the data source, a current list of objects at the different layers of the computing system. The program code generates updated exploration lists from the current list, where each updated exploration list comprises current objects for a given layer of the computing system. The program code identifies, based on utilizing the updated exploration lists, current updated data and current new data at each of the layers, where the current updated data and the current new data are associated with the objects comprising the current list, where the identified data comprises additional attributes for each layer. The program code applies one or more machine learning algorithms to the identified data to enrich the current updated data and the current new data by identifying dependencies between one or more groups of the additional attributes for each layer, where each group of the one or more groups of the additional attributes for each layer comprises additional influencers for the one or more key performance indicators of the computing system. The program code updates, based on the enriched current updated data and the enriched current new data, the hierarchy matrix in the data source.

In some embodiments of the present invention, the program code determines that the hierarchy matrix is below the given quality threshold by determining that a given period of time has elapsed since the hierarchy matrix was updated.

In some embodiments of the present invention, the program code determines that the hierarchy matrix is below the given quality threshold by determining that a given number of new objects have been added to the list of objects in the data source.

In some embodiments of the present invention, the program code identifies the updated data and the new data at each of the layers, at each layer, in parallel.

Referring now to FIG. 11, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, each module and/or database illustrated in FIG. 4 as well as all elements in the node layer 450 can be understood as a cloud computing node 10 (FIG. 11) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 11, computer system/server 12 that can be utilized as cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
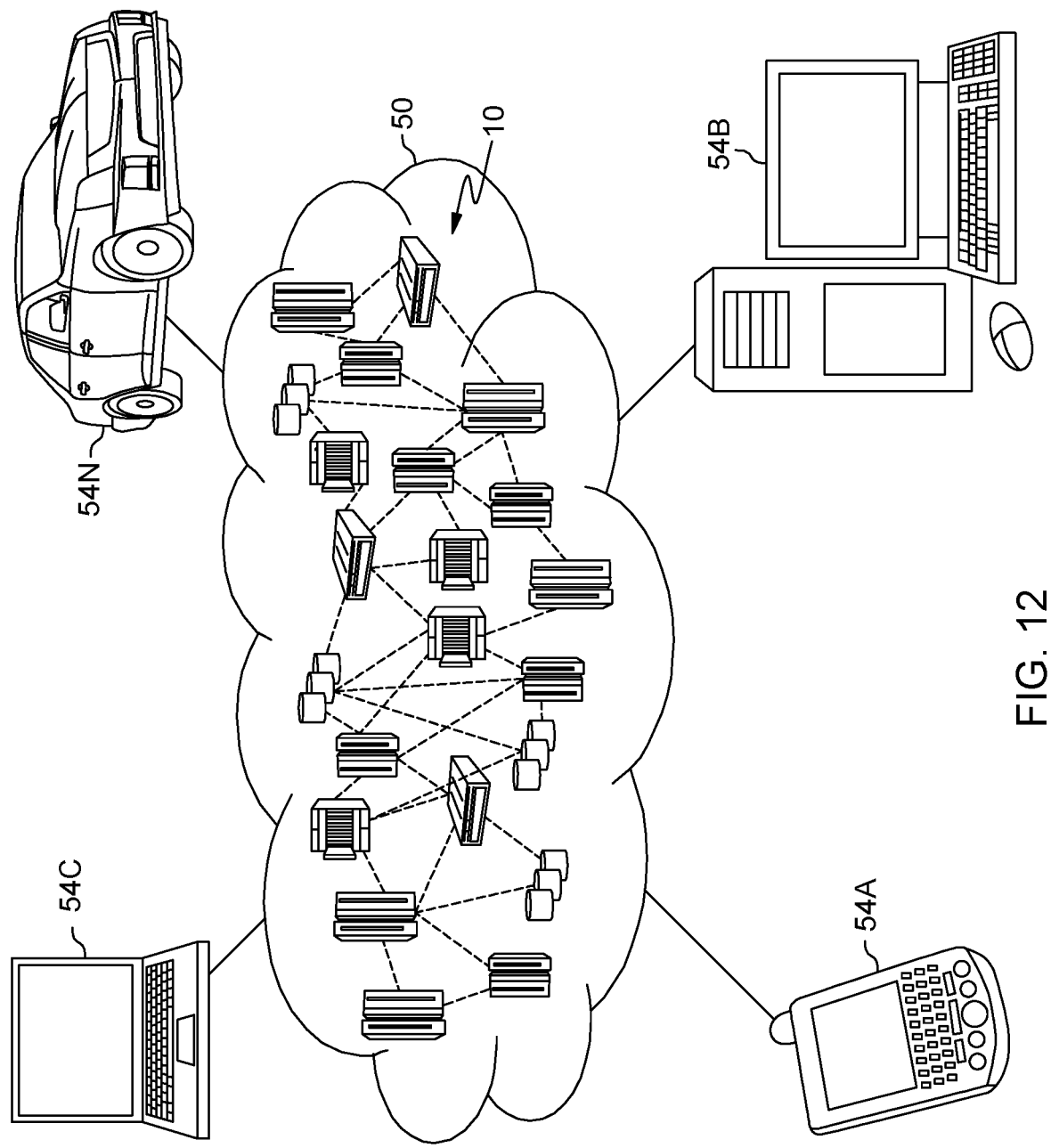
FIG. 12 depicts a cloud computing environment according to an embodiment of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
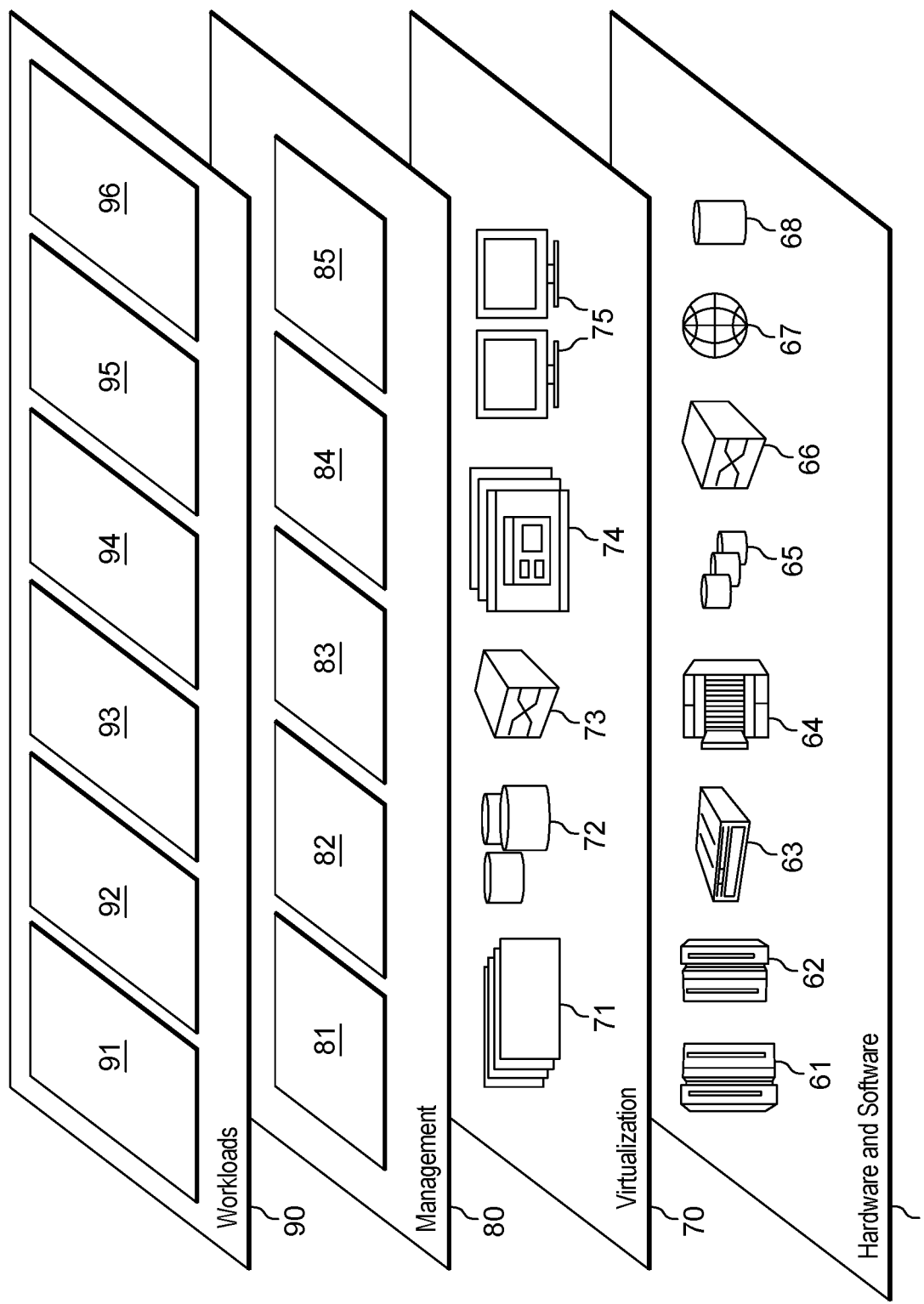
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; generating a hierarchy tree to correlate factors across an enterprise system in order to anticipate events that impact internal KPI within the enterprise system 96.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   obtaining, by one or more processors, from a data source, a list of objects at different layers of a computing system, wherein the layers comprise nodes, applications, interfaces, services, and processes;
   generating, by the one or more processors, exploration lists from the list, wherein each exploration list comprises objects for a given layer of the computing system;
   identifying, by the one or more processors, based on utilizing the exploration lists, updated data and new data at each of the layers, wherein the updated data and the new data are associated with the objects comprising the list, wherein the identified data comprises attributes for each layer;
   applying, by the one or more processors, one or more machine learning algorithms to the identified data to enrich the updated data and the new data by identifying dependencies between one or more groups of the attributes for each layer, wherein each group of the one or more groups comprises influencers for one or more key performance indicators of the computing system;
   generating, by the one or more processors, from the enriched data, a hierarchy matrix, wherein the hierarchy matrix comprises trees representing each group of the one or more groups; and
   determining, by the one or more processors, based on the hierarchy matrix that an event associated with one or more computing resources of the computing system will influence a particular key performance indicator.

2. The computer-implemented method of claim 1, further comprising:
   mitigating, by the one or more processors, the influence of the one or more computing resources on the particular key performance indicator by taking an action, the action selected from the group consisting of: notifying, by the one or more processors, a user, via a graphical user interface of a computing device of the computing system, of the determination and automatically implementing a pre-defined mitigation action in the computing system.

3. The computer-implemented method of claim 1, further comprising:
   storing, by the one or more processors, the hierarchy matrix in the data source.

4. The computer-implemented method of claim 3, wherein the storing comprises inserting the enriched data as attributes for the objects comprising the list.

5. The computer-implemented method of claim 3, further comprising:
   determining, by the one or more processors, that the hierarchy matrix is below a given quality threshold;
   based on the determining, obtaining, by the one or more processors, from the data source, a current list of objects at the different layers of the computing system;
   generating, by the one or more processors, updated exploration lists from the current list, wherein each updated exploration list comprises current objects for a given layer of the computing system;
   identifying, by the one or more processors, based on utilizing the updated exploration lists, current updated data and current new data at each of the layers, wherein the current updated data and the current new data are associated with the objects comprising the current list, wherein the identified data comprises additional attributes for each layer;
   applying, by the one or more processors, one or more machine learning algorithms to the identified data to enrich the current updated data and the current new data by identifying dependencies between one or more groups of the additional attributes for each layer, wherein each group of the one or more groups of the additional attributes for each layer comprises additional influencers for the one or more key performance indicators of the computing system;
   updating, by the one or more processors, based on the enriched current updated data and the enriched current new data, the hierarchy matrix in the data source.

6. The computer-implemented method of claim 5, wherein determining that the hierarchy matrix is below the given quality threshold comprises determining that a given period of time has elapsed since the hierarchy matrix was updated.

7. The computer-implemented method of claim 6, wherein determining that the hierarchy matrix is below the given quality threshold comprises determining that a given number of new objects have been added to the list of objects in the data source.

8. The computer-implemented method of claim 1, wherein the one or more machine learning algorithms are selected from the group consisting of: text analytics, natural language processing, and statistical modelling.

9. The computer-implemented of claim 1, wherein generating the hierarchy matrix further comprises:
   performing, by the one or more processors, a rules operation on the updated data and the new data;
   applying, by the one or more processors, analytics on the updated data and the new data, wherein the analytics comprise a textual analysis, to generate a statistical model; and
   performing, by the one or more processors, a cognitive analysis on the updated data and the new data.

10. The computer-implemented method of claim 1, further comprising:
    transmitting, by the one or more processors, the hierarchy matrix to a user, via a graphical user interface; and
    obtaining, by the one or more processors, feedback on the hierarchy matrix from the user.

11. The computer-implemented method of claim 10, further comprising:
    automatically updating, by the one or more processors, a portion of the hierarchy matrix, based on the feedback.

12. The computer-implemented method of claim 1, wherein identifying the updated data and the new data at each of the layers, is performed, at each layer, in parallel.

13. A computer program product comprising:
a computer readable storage medium readable by one or more processors and storing instructions for execution by the one or more processors for performing a method comprising:
   obtaining, by the one or more processors, from a data source, a list of objects at different layers of a computing system, wherein the layers comprise nodes, applications, interfaces, services, and processes;
   generating, by the one or more processors, exploration lists from the list, wherein each exploration list comprises objects for a given layer of the computing system;
   identifying, by the one or more processors, based on utilizing the exploration lists, updated data and new data at each of the layers, wherein the updated data and the new data are associated with the objects comprising the list, wherein the identified data comprises attributes for each layer;
   applying, by the one or more processors, one or more machine learning algorithms to the identified data to enrich the updated data and the new data by identifying dependencies between one or more groups of the attributes for each layer, wherein each group of the one or more groups comprises influencers for one or more key performance indicators of the computing system;
   generating, by the one or more processors, from the enriched data, a hierarchy matrix, wherein the hierarchy matrix comprises trees representing each group of the one or more groups; and
   determining, by the one or more processors, based on the hierarchy matrix that an event associated with one or more computing resources of the computing system will influence a particular key performance indicator.

14. The computer program product of claim 13, further comprising:
   mitigating, by the one or more processors, the influence of the one or more computing resources on the particular key performance indicator by taking an action, the action selected from the group consisting of: notifying, by the one or more processors, a user, via a graphical user interface of a computing device of the computing system, of the determination and automatically implementing a pre-defined mitigation action in the computing system.

15. The computer program product of claim 13, further comprising:
   storing, by the one or more processors, the hierarchy matrix in the data source.

16. The computer program product of claim 15, wherein the storing comprises inserting the enriched data as attributes for the objects comprising the list.

17. The computer program product of claim 13, wherein the one or more machine learning algorithms are selected from the group consisting of: text analytics, natural language processing, and statistical modelling.

18. The computer program product of claim 13, wherein generating the hierarchy matrix further comprises:
   performing, by the one or more processors, a rules operation on the updated data and the new data;
   applying, by the one or more processors, analytics on the updated data and the new data, wherein the analytics comprise a textual analysis, to generate a statistical model; and
   performing, by the one or more processors, a cognitive analysis on the updated data and the new data.

19. The computer program product of claim 13, further comprising:
   transmitting, by the one or more processors, the hierarchy matrix to a user, via a graphical user interface; and
   obtaining, by the one or more processors, feedback on the hierarchy matrix from the user.

20. A system comprising:
a memory;
one or more processors in communication with the memory;
program instructions executable by the one or more processors via the memory to perform a method, the method comprising:
   obtaining, by the one or more processors, from a data source, a list of objects at different layers of a computing system, wherein the layers comprise nodes, applications, interfaces, services, and processes;
   generating, by the one or more processors, exploration lists from the list, wherein each exploration list comprises objects for a given layer of the computing system;
   identifying, by the one or more processors, based on utilizing the exploration lists, updated data and new data at each of the layers, wherein the updated data and the new data are associated with the objects comprising the list, wherein the identified data comprises attributes for each layer;
   applying, by the one or more processors, one or more machine learning algorithms to the identified data to enrich the updated data and the new data by identifying dependencies between one or more groups of the attributes for each layer, wherein each group of the one or more groups comprises influencers for one or more key performance indicators of the computing system;
   generating, by the one or more processors, from the enriched data, a hierarchy matrix, wherein the hierarchy matrix comprises trees representing each group of the one or more groups; and
   determining, by the one or more processors, based on the hierarchy matrix that an event associated with one or more computing resources of the computing system will influence a particular key performance indicator.

* * * * *